UNITED STATES PATENT OFFICE.

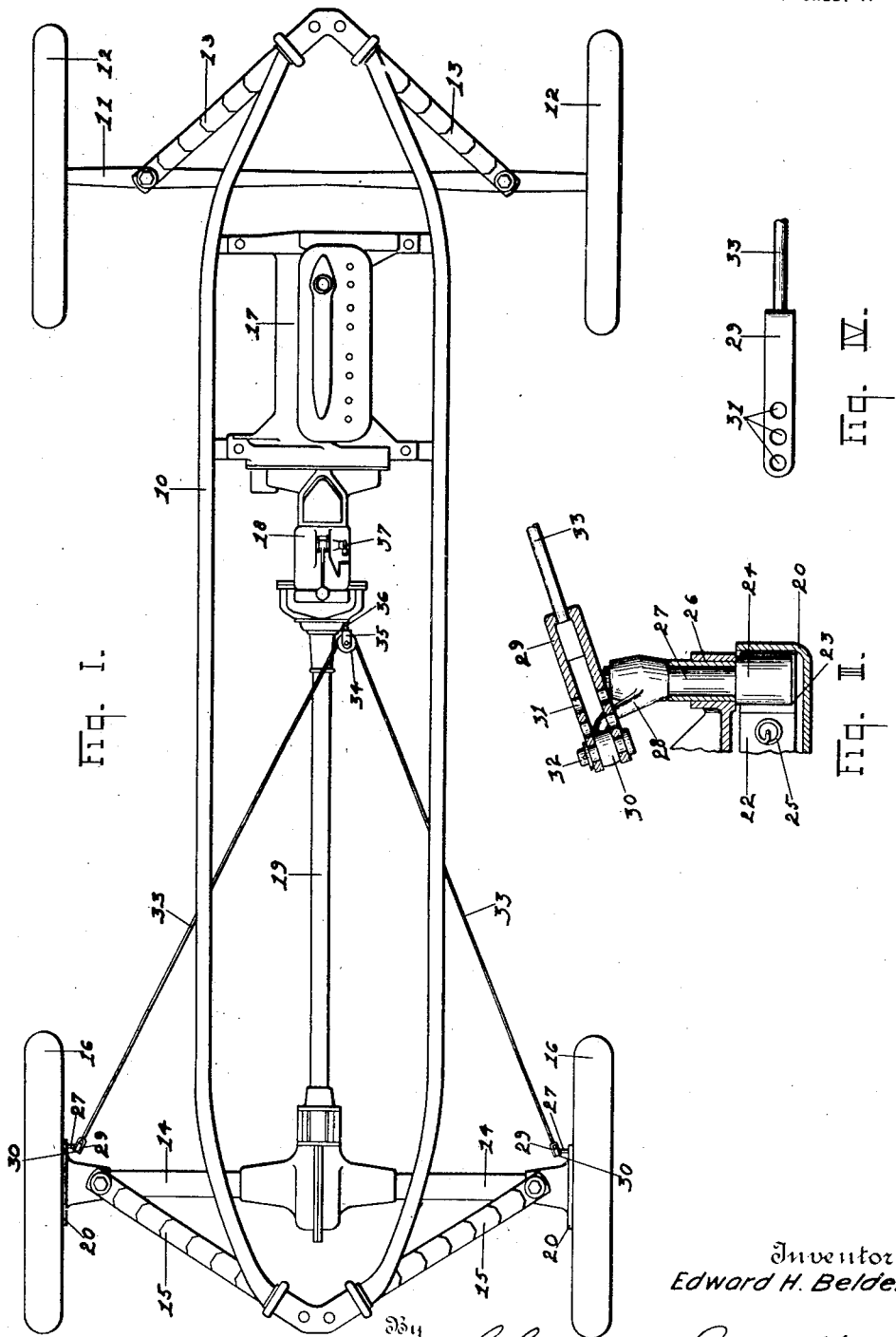

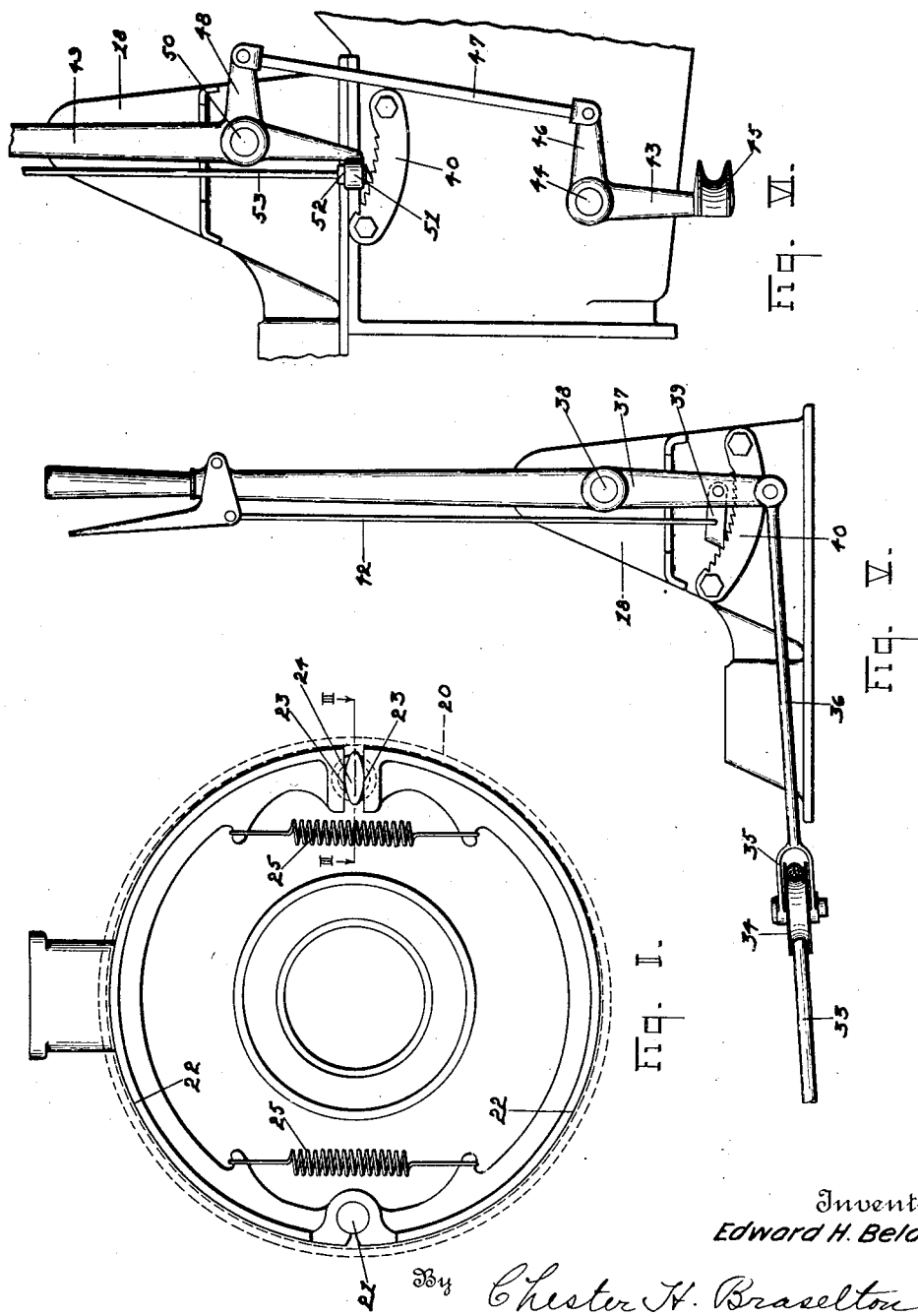

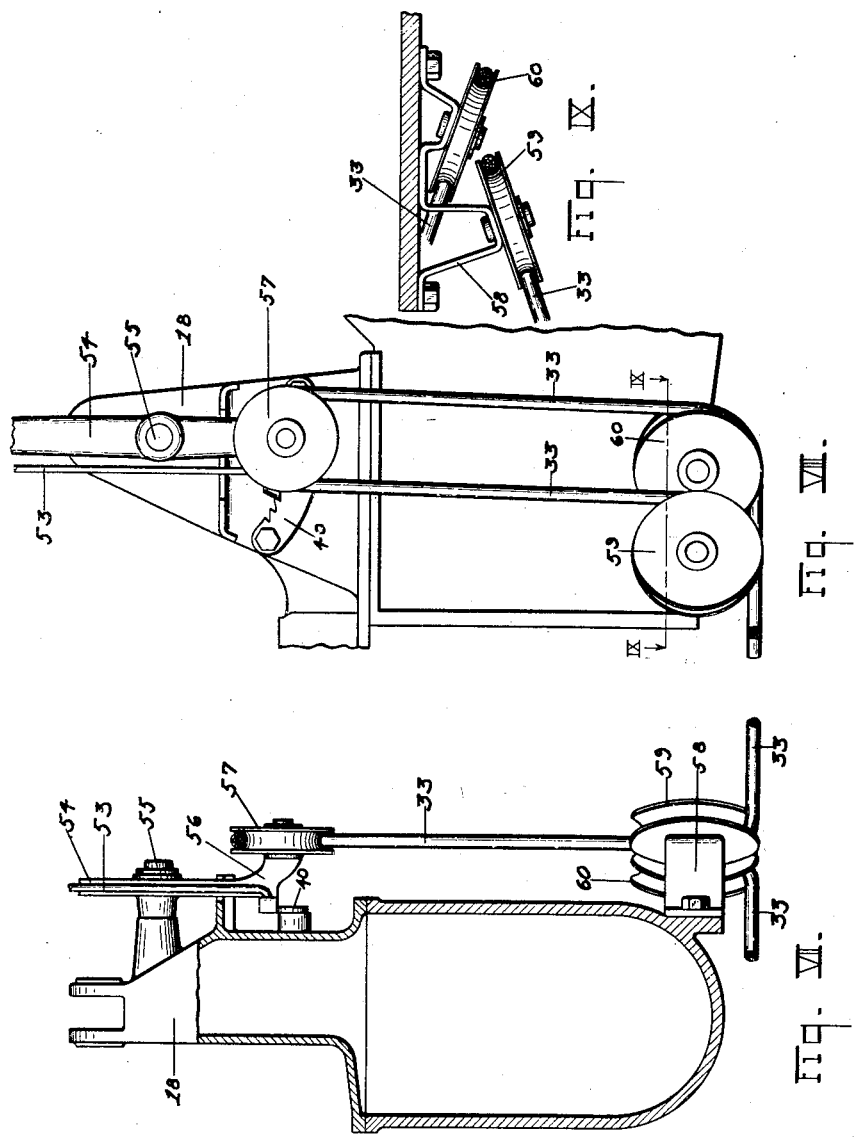

EDUARD H. BELDEN, OF TOLEDO, OHIO, ASSIGNOR TO INDUSTRIAL RESEARCH CORPORATION, OF TOLEDO, OHIO, A CORPORATION OF DELAWARE.

EQUALIZING BRAKE MECHANISM.

1,337,815.

Specification of Letters Patent.   Patented Apr. 20, 1920.

Application filed July 26, 1917. Serial No. 182,856.

*To all whom it may concern:*

Be it known that I, EDUARD H. BELDEN, a citizen of the United States, residing at Toledo, in the county of Lucas and State of Ohio, have invented certain new and useful Improvements in Equalizing Brake Mechanism, of which I declare the following to be a full, clear, and exact description.

This invention relates to an improved equalizing brake mechanism for motor vehicles.

The principal object of this invention is to provide an improved brake mechanism in which the braking pressure on the drive wheels is equalized. A further object of this invention is to provide a simple and inexpensive brake operating mechanism which can be produced and assembled in a car at a low cost.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which—

Figure I is a top plan view of the chassis of a motor vehicle, embodying my invention.

Fig. II is a view in side elevation of one end of the rear axle, the wheel being removed, said view showing the construction of the brake.

Fig. III is a detail, fragmentary, sectional view, taken substantially on the line III—III of Fig. II.

Fig. IV is a fragmentary, detail view in side elevation showing the yoke for connecting the end of the cable to the rock shaft operating arm.

Fig. V is a view in side elevation of the emergency brake lever and its mounting, showing the connection between said lever and the equalizing cable.

Fig. VI is a view in side elevation, showing a modified form of the means for operating the equalizing cable.

Fig. VII is a view in end elevation of another modified form of operating means for the equalizing cable, the view being taken in section through the transmission case.

Fig. VIII is a view in side elevation of the modification illustrated in Fig. VII, and Fig. IX is a detail, sectional view, taken substantially on the line IX—IX of Fig. VIII and showing the lower idler pulleys, over which the equalizing cable passes, in top plan view.

In the drawings, similar reference numerals refer to similar parts throughout the several views, and the sectional views are taken looking in the direction of the little arrows at the ends of the section lines.

Considering the numbered parts of the drawing, frame 10 is supported from the front axle 11 by the springs 13, and from the rear axle 14 by the springs 15. Said front axle carries the usual steering wheels 12 and the rear axle carries the rear driving wheels 16. An engine 17 is mounted on the frame 10 and drives the rear live axle through the transmission 18 and the propeller shaft housed in the tube 19. The brake flanges 20 are provided in the usual manner on the rear wheels, and the brake shoes 22 are pivoted at 21 within the brake hubs formed on the ends of the rear axle so as to engage the inner surface of the corresponding flange 20. The free ends of the brake shoes 22 have the surfaces or heads 23 between which the cam 24 is disposed, so that, as this cam is rotated, the shoes 22 will be spread to firmly engage the flange 20 on the wheel 16, so as to brake the same. Springs 25 are provided, connected at their opposite ends to opposite shoes 22, so as to normally draw said shoes toward each other and hold them out of braking engagement with the flange.

The cam 24 is formed on the end of the rock shaft 27, which is journaled in a boss 26 provided in the hub on the end of the rear axle casing 14, and said rock shaft is provided with a crank arm 28, extending upwardly and laterally therefrom and having a head 30, which is twisted so as to lie in a plane inclined to the plane of the wheel 16. A yoke 29 embraces the head 30, and is provided with a number of holes 31, through any two of which a pin 32 may be passed, so as to adjustably connect the yoke 29 to the head 30 on the rock shaft crank arm 28. The yokes 29 are secured to the ends of the equalizing cable 33, which passes forward from one of the yokes 29, around the pulley 34, and back to the other yoke 29 on the opposite side. The pulley 34 around which the equalizing cable 33 passes, is journaled in the yoke 35, formed at the end of the rod 36, which is pivotally connected to the lower end of the lever 37, which is pivoted at 38 on the transmission case. A ratchet 40 is fixed to the transmission case and engaged by pawl 39, which is controlled by the rod 42 in the usual manner.

In Fig. VI I have shown a modified arrangement for operating the equalizing cable. In this arrangement a bell crank lever is provided, which is pivotally mounted at 44 on the transmission case and has a lower arm 43, formed with a head 45, which is suitably grooved and around which the equalizing cable passes. The laterally projecting arm 46 of the bell crank is connected by the link 47 with the arm 48 projecting from the lever 49, which is pivoted at 50 on the transmission case 18. The rack 40 is provided and is engaged by pawl 52, which is slidably mounted in the boss 51, at the lower end of the lever 49, said pawl being controlled by the rod 53 in the usual manner.

In Figs. VII to IX, I have shown another modified arrangement for operating the equalizing cable. In this arrangement a lever 54 is pivoted at 55 on the transmission case and has a laterally projecting arm 56, on which the pulley 57 is journaled. A bracket 58 is secured to the lower part of the transmission case and pulleys 59 and 60 are journaled on said bracket, said pulleys being disposed in planes inclined to each other, the planes in which said pulleys are disposed being the planes in which the equalizing cable extending from each of them to the brake lies, and said pulleys being so disposed that one edge of each of them lies in a common plane, which is the plane of the pulley 57. The cable 33 comes from one of the rock arms at the rear axle forward to the pulley 59, passes around the pulley 59 and up and over the pulley 57 then down to the pulley 60 and from said pulley 60 passes to the other brake operating rock arm.

From the description of the parts given above, the operation of my device should be very readily understood. When it is desired to set the emergency brake, the lever 37 is operated in the usual manner. This moves the lower end of the lever forward, pulling the rod 36, which moves the pulley 34 so as to exert a tension or a pull on the equalizing cable 33, which rocks the shafts 27 through the medium of the shackles 29 and the rock arms 28. This rotation of the rock shafts 27 turns the cams 24, so as to spread the brake shoes and apply the brakes.

The head 30 on the crank arm 28 is twisted so as to lie in the plane in which the pull of the equalizing cable 33 will be directed, so that there are no side forces acting upon the rock arm, and the pull of the cable, which is directed at an angle, is directly transmitted to the rock shafts to rock the same. It will be seen that, by this arrangement, in which the cable passes over the pulley 34, the forward movement of the pulley 34 when the brake lever is operated will serve to set the brakes and at the same time the cable will equalize itself so that the brakes will be set fully on both sides. This eliminates the necessity for an accurate adjustment of the connections between the brake lever and the brakes as when rods are used to form such connections.

The construction shown in Fig. VI illustrates a different manner of putting a tension on the cable 33, so as to apply the brakes. In this form, when the lever 49 is operated, the end of the arm 48 is moved upward pulling up on the link 47 so as to rock the bell crank on its pivot 44, to pull the end of the arm 43 forwardly so as to put a tension on the cable 33. By this means the brakes are applied.

It will be seen that, by using the construction shown in Fig. VI, the point at which tension is applied to the equalizing cable can be brought lower relatively to the chassis than in the preferred construction, shown in Figs. I to V. In the preferred construction the pulley 34 is located in a plane above the rear axle and loading of the car will slacken the cable somewhat while in the construction shown in Fig. VI, the head 45 is on a line with the rear axle, under normal conditions and loading will tend to increase the tension on the cable.

In Figs. VII to IX I have shown still another manner of putting a tension on the cable 33 so as to apply the brakes. In this form of my device, when the lever 54 is operated, the pulley 57, which is carried by the arm 56 on the lower end of the lever 54, is moved to one side so as to increase its distance from the fixed pulleys 59 and 60. As the cable 33 passes around the pulleys 59 and 60, and over the pulley 57, this movement of the lever 54 will necessarily put a tension upon the equalizing cable 33, so as to apply the brakes.

I am aware that this embodiment of my invention, which I have here shown and described, is susceptible of considerable variation without departing from the spirit of my invention, but I have found that this particular embodiment is desirable from many standpoints, and, therefore, I desire to claim the same specifically as well as broadly, as indicated by the appended claims.

Having thus described my invention, what I claim as new and desire to secure by Letters Patent is—

1. In a vehicle, the combination of a pair of internal expanding hub brakes; a rock shaft for expanding each of said brakes; an arm on each rock shaft extending upwardly therefrom, and having a head lying in a plane extending at an angle to the vehicle frame; a yoke adjustably secured to each head; a brake lever; a link connected at its lower end to said lever; a pulley journaled in the rear end of said link; and a cable connected at its ends to said yokes and passing over said pulley.

2. In a vehicle, the combination of a pair of internal expanding hub brakes; a rock shaft for expanding each of said brakes; an arm on each rock shaft extending upwardly therefrom and having a head lying in a plane extending at an angle to the vehicle frame; a yoke adjustably secured to each head; a brake lever; a pulley; link connections between said brake lever and said pulley, whereby said pulley will be moved when said brake lever is operated; and a cable connected at its ends to said yoke and passing over said pulley.

3. In a vehicle, the combination of a pair of internal expanding hub brakes; a rock shaft for expanding each of said brakes; an arm on each rock shaft extending upwardly therefrom and having a head lying in a plane extending at an angle to the vehicle frame; a brake lever; a pulley; connections between said brake lever and said pulley, whereby said pulley will be moved when said brake lever is operated; and a cable connected at its ends to said heads and passing over said pulley.

4. In a vehicle, the combination of a pair of hub brakes, a rock shaft for expanding each of said brakes, an arm on each rock shaft having its free end inclined in a plane at an angle to the longitudinal axis of the vehicle, a forked member secured to the inclined portion of each of said arms, a brake lever, a pulley connected to the lever, and a cable connecting the pulley with said forked members.

5. In a vehicle, the combination of a pair of hub brakes, a rock shaft for expanding each of said brakes, an arm on each rock shaft having its free end inclined to extend in a plane at an angle to the longitudinal axis of the vehicle, a forked member upon the inclined ends of each of said arms, a brake lever, and a connection between the lever and said forked members.

In testimony whereof I affix my signature.

EDUARD H. BELDEN.

It is hereby certified that in Letters Patent No. 1,337,815, granted April 20, 1920, for an improvement in "Equalizing Brake Mechanism," the name of the patentee is erroneously written and printed as "Eduard H. Belden," whereas said name should have been written and printed as *Edward H. Belden;* and that the said Letters Patent should be read with this correction therein that the same may conform to the record of the case in the Patent Office.

Signed and sealed this 22d day of June, A. D., 1920.

[SEAL.]

M. H. COULSTON,
*Acting Commissioner of Patents.*

Cl. 188—78.